United States Patent [19]

Bykowski et al.

[11] 4,029,575
[45] June 14, 1977

[54] PHOSPHORUS REMOVAL FROM WASTE WATER

[75] Inventors: Michael J. Bykowski, West Bend; Lloyd Ewing, Bay Side, both of Wis.

[73] Assignee: Ewing Engineering Company, Milwaukee, Wis.

[22] Filed: June 9, 1972

[21] Appl. No.: 263,740

[52] U.S. Cl. .................. 210/16; 210/19; 210/47; 210/49; 210/195 S; 210/202; 210/DIG. 29

[51] Int. Cl.² ................................ C02C 5/10

[58] Field of Search ............ 210/195, 5, 7, 10, 11, 210/16, 19, 47, 2, 15, 18, 280, 49, 14, 201, 202, DIG. 29

[56] References Cited
UNITED STATES PATENTS

| | | | |
|---|---|---|---|
| 2,875,151 | 2/1959 | Davidson | 210/16 |
| 3,236,766 | 2/1966 | Levin | 210/6 |
| 3,390,077 | 6/1968 | Forrest | 210/11 |
| 3,461,067 | 8/1969 | Matsumoto et al. | 210/47 |
| 3,480,144 | 11/1969 | Barth et al. | 210/18 |
| 3,513,091 | 5/1970 | Bevans | 210/19 |

Primary Examiner—Frank A. Spear, Jr.
Assistant Examiner—Benoit Castel
Attorney, Agent, or Firm—Pollock, Vande Sande & Priddy

[57] ABSTRACT

A process and apparatus for decreasing the phosphorus content of waste water by means of contacting the waste water with the products of aqueous reaction with elemental iron, preferably subjecting the mixture to sequential aerobic and anaerobic conditions, and concentration of the suspended solids fraction which contains the major portion of the influent phosphorus in solid stable form, and separating the relatively clear liquid fraction therefrom.

Contacting the waste water with products of the aqueous reaction with elemental iron may be brought about by recycling at least part of the separated solids through at least part of the process.

16 Claims, 8 Drawing Figures

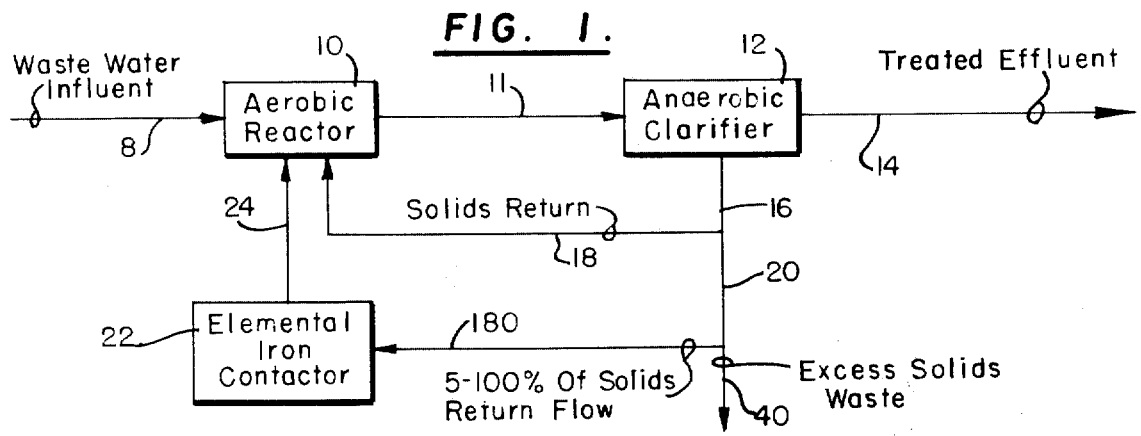
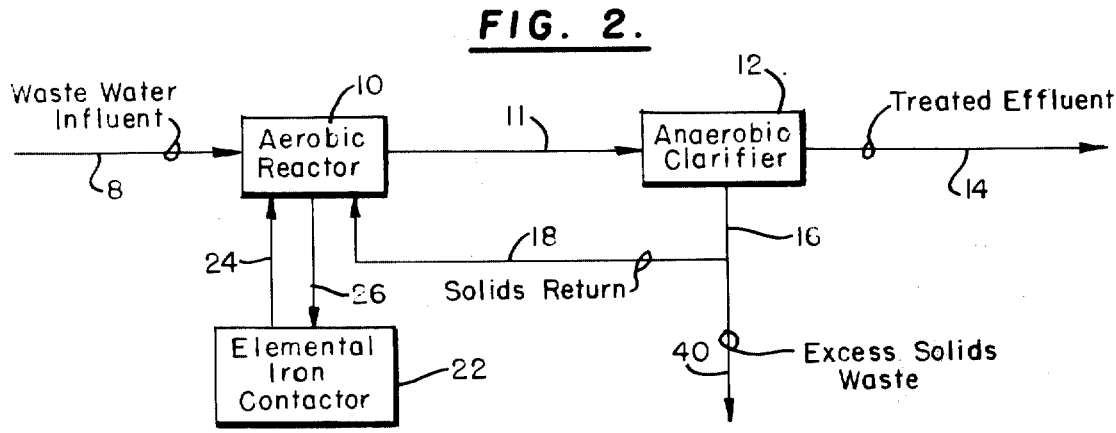
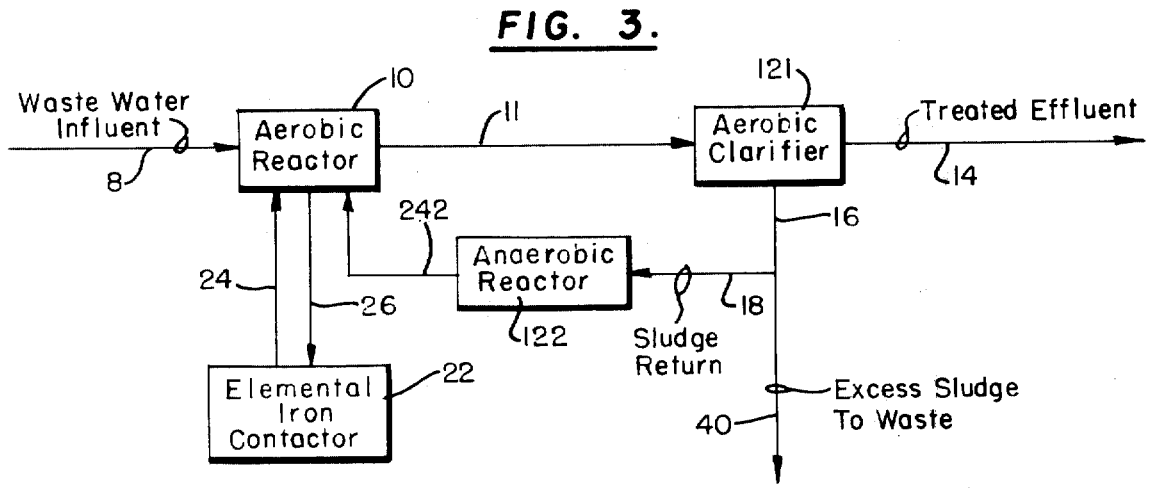

PHOSPHORUS REMOVAL FROM WASTE WATER

BACKGROUND OF INVENTION

The effect of phosphorus in waste water on the lakes and streams into which such water flows is so serious that its removal is recognized to be beneficial, if not imperative. Attention is invited to U.S. House of Representatives Report 91-1004, pages 1 to 9.

When certain forms of phosphorus are present in lakes, rivers and streams, the resultant fertilization of the waters promotes the growth of algae and other undesirable vegetation. These are unsightly, produce obnoxious odors on decaying, prevent recreational use of the waters and may be toxic to aquatic, domestic and wild animals.

It is a paradox that conventional sewage treatment plants may actually increase the immediate availability of harmful phosphorus in natural bodies of water. Those plants which involve biological processes are examples, e.g., activated sludge plants, trickling filters and the like.

The activated sludge processes include diffusing air through influent waste water to develop suspended colonies of biological growths or organisms which thrive in the presence of oxygen. A biologically active sludge is thus formed. When the latter is contacted with incoming waste water in a reactor, the organisms and organic components in the water engage in biochemical reactions such as for instance bioprecipitation, adsorption, absorption and aqueous oxidation. The incoming waste water and semi-purified water which contains active microorganisms are introduced into and removed from the reactor on a continuous or periodic basis in a generally balanced relationship.

Following the reactor the semi-purified waste water which contains significant quantities of suspended materials is subjected to a step in the process wherein the mixture is clarified and the relatively clear liquid separated from that portion containing the greater quantity of suspended solids. This clarification may be accomplished in a number of ways including sedimentation, flotation, filtration, screening or centrifuging. The resultant clear fraction is in some instances sufficiently pure for reuse or disposal in the receiving water course. In some instances, other and additional treatment procedures such as further removal of dissolved or suspended materials are practiced prior to reuse or disposal.

The concentrated fraction which contains most of the suspended solids may either be subjected to further or other treatments, disposal, recycle to the reactor, or, more typically, a combination thereof. In the latter instance a given quantity of sludge contacts the same water a plurality of times before the water and sludge are finally removed from the systems. By recycling in this manner, up to 90% or more of the organic contaminants of the influent waste water can be eliminated.

Besides strictly organic waste, the influent of a sewage treatment plant very commonly contains significant quantities of mineral elements, including both insoluble and soluble forms of phosphorus, the latter being generally recognized as the form which is most readily used by algae and the like. While the microorganisms used in biological sewage treatment plants metabolically utilize some phosphorus, the microorganisms reportedly convert enough organically bound phosphorus to soluble form so that — as compared to the influent — the effluent may contain more of the soluble phosphorus so readily assimilated by the undesired vegetation. See U.S. Pat. No. 3,236,766. Moreover, it is recognized elsewhere that conventional biological sewage treatment plants are at best ill-equipped to cope successfully with phosphorus. See U.S. Pat. Nos. 3,423,309 and 3,390,077.

As a consequence of the serious problems resulting from phosphorus in waste waters, and the failure of conventional treatment facilities to remove significant quantities thereof, considerable effort has been and will continue to be devoted toward that end. Many methods are under consideration and trial, including electrodialysis, reverse osmosis, ion exchange, increased biological uptake, adsorption, precipitation with rare earth elements, controlled algal systems and controlled biological release.

None of these methods has attained widespread commercial significance. Under present technology all require either prohibitive capital costs, operating cost, or delicate control. Those procedures which are in commercial use are generally not widely applied, because of the problems and high costs associated with the methods as well as lack of general applicability.

Presently, the most frequently employed method of phosphorus removal is precipitation by the addition of metal oxides, such as calcium, magnesium, or sodium aluminate, or by the addition of metal salts such as iron or aluminum as chlorides or sulfates.

These chemicals have been applied at various stages of the treatment process, including the primary sedimentation stage, the secondary system prior to secondary clarification or as a tertiary stage requiring an additional solids liquid separation step.

The disadvantages inherent in all these methods are numerous and well-known.

The metal oxides are all strongly alkaline and effect a change in pH which must be accounted for or managed so as not to interfere with other functions of the process. Regulation of pH frequently requires additional equipment, controls, other chemical treatment, and additional operator attention.

The metallic salts are all strongly acid. Dealing with them involves problems comparable to those resulting from the use of metal oxides. The acidic conditions that result can impart similar limitations on the process. Addition of these chemicals in the primary or tertiary stages requires accurate proportioning of chemical dosage to influent phosphorus loading for efficient use of the chemicals. Sophisticated controls and/or continuous operator attention is required for efficient operation. In many cases effective removals of phosphorus require the additional use of flocculating chemicals such as polyelectrolytes, frequently in conjunction with carefully metered inorganic chemicals.

Application of these chemicals as a tertiary stage usually requires additional, or larger than otherwise necessary equipment, such as clarifiers, filters, or strainers, with the necessary associated equipment.

The removal of phosphorus by any of these methods produces additional sludge which must be disposed of, usually at significant cost. The precipitate formed in the use of the metal salts is voluminous and does not compact well by the usual means employed. Consequently, significantly larger volumes of sludge must be disposed of, particularly when the metal salts are applied to the primary or tertiary stages of treatment. These voluminous solids separate from the waste water with difficulty and so more costly separating equipment is required.

Frequently, when metal oxides are applied, a significant portion of the supplied cation is not utilized in the reaction and remains in solution as a contaminant, reducing the value of the treated water for subsequent re-use and creating undesirable effects in the receiving water system. When metal salts are used none of the anions are utilized, and remain in solution with similar, though perhaps more serious detrimental results. Other chemicals, which are frequently required for the efficient use of the prime chemicals, add to the detrimental effect.

In all except unusual circumstances, these chemicals are relatively costly, and their use represents a significant part of the total treatment cost.

For all these reasons phosphorus removal has not been practiced in waste treatment systems to an extent commensurate with the apparent public need or interest.

DEFINITIONS

The following definitions pertain in this disclosure:

Faculative organisms — organisms that can function in environments whether free oxygen is either lacking or present.

Aerobic organisms — organisms that thrive in an environment containing free or readily available oxygen.

Anaerobic organisms — organisms that thrive in an environment deficient or lacking in free or readily available oxygen.

Biological treatment — reducing the concentration of contaminants in a system containing waste water by process steps comprising absorption by and/or adsorption by and/or the metabolic processes of, microorganisms within the system.

Aerobic conditions are considered to be those in which the dominant react on with respect to iron is the conversion of the ferrous to the ferric form. When applied to biological treatment, the term includes the further requirement that there be a sufficient supply of readily available oxygen for supporting aerobic microbiological activity. Anaerobic conditions are considered to be those in which the dominant reaction with respect to iron is the conversion of ferric to the ferrous form. When applied to biological treatment, the term includes the further requirement that there be a sufficient shortage of readily available oxygen for impeding aerobic and fostering anaerobic microbiological activity.

Primary treatment — The first process applied in the treatment of waste water wherein substantial quantities of the suspended solid contaminants are removed from the waste water.

Secondary treatment — A process applied subsequent to or in lieu of a primary process wherein substantial quantities of dissolved, colloidal and larger suspended contaminants are removed by any one of a number of techniques including biological contact, absorption, adsorption and chemical reaction, frequently in conjunction with liquid clarification procedures.

Tertiary treatment — A process applied subsequent to secondary treatment to refine the treated effluent by further removal of contaminants including suspended solids, color, taste, dissolved materials and nutrients.

Waste Water — Any contaminant-bearing water from any source whether untreated or pre-treated or in the process of treatment to remove contaminants, and any other water which is introduced into this waste water treatment process.

SUMMARY OF INVENTION

The invention comprises generally a method and apparatus for removing phosphorous from waste water by reacting the waste water from elemental iron or from aqueous reaction products of elemental iron, concentration of the suspended solids in the waste water and separation of part of the liquid fraction therefrom.

The effectiveness of the process can be appreciably enhanced by maintaining the waste water under treatment sequentially under aerobic and anearobic conditions of a preferred minimum period of time, for example 10 minutes under each of said conditions. There is no upper limit on effective residence time in these treating steps beyond which the process is inoperative; however, the time should not be unnecessarily prolonged if it is desired to obtain a plant of maximum through-put for the least investment.

A number of other factors alone, or in combination, also enhance the efficiency of the process. These include recycling a portion of the iron bearing concentrated suspended solids back through at least a part of the process, controlling the ratio of iron added to phosphorus introduced, in the approximate range of 1 - 16 mols of iron per 4 mols of phosphorus, conducting the aqueous reaction of the iron under agitation, in some cases, in the presence of oxygen.

The invention produces unexpected benefits when applied to a biological treatment process, though its application is not limited thereto.

Our invention reduces or overcomes the difficulties of the prior art method previously discussed and provides a means for the substantial removal of phosphorus from waste water that is economical, effective and requires a minimum of operator attention, while providing one or more of the following benefits.

Our invention provides an effective way for utilizing elemental iron as a phosphorus removal agent. Aqueous contact of iron, preferably with agitation, and subsequent maintenance of aerobic and anaerobic conditions, enables the formation of insoluble iron phosphorus compounds with less effect on pH than with the metal oxides or salts. Usually no additional chemicals are required for pH control; consequently pH control equipment is not required and operator attention is less.

We have found that if the system is operated to provide an excess of iron compounds, and if these compounds are recycled within the system, accurate proportioning of iron applied to phosphorus load is not required to achive consistent and continuous substantial removal of phosphorus.

We have also found that when the iron solids produced in the contactor or reactor are recycled through some portion of the process and/or through the clarification phase of the treatment process and when alternate aerobic and anaerobic conditions are maintained within the process, the effectiveness of the iron as a phosphate removal agent can be significantly enhanced. It is believed that this mechanism can be partially explained by the hypothesis that some of the insoluble ferric compounds are reduced to the soluble ferrous form in the anaerobic stage.

Any such dissolved ferrous iron is apparently available for precipitation as insoluble compounds or complexes containing phosphorous. Ferrous ions remaining in solution through the anaerobic phasing will presumably be applied to ferric in the aerobic phasing, and are available to combine with any dissolved phosphorous in other even less soluble compounds or complexes. Furthermore, the resultant homogenous dispersion of ferrious ions in solution during their conversion to ferric is believed to improve the probability of forming the insoluble phosphates, and the in situ formation of ferric hydroxide is believed to be more effective than contact with preformed hydroxide in the removal of phosphorous. The efficiency of the iron as a phosphours precipitator is thus enhanced.

We have observed another advantage which can be obtained by recycling the solids through the process and maintaining alternate aerobic conditions, Frequently, a significant fraction of the phorous in the waste water is in the form of polyphosphates which are apparently precipitated less efficiently or less readily by the iron than orthophosphates. By maintenance of the aerobic conditions one can convert the polyphosphates to orthophosphates which more readily combine with the ferrous and ferric iron compounds previously discussed.

In the use of elemental iron as we practice it, virtually all of the iron can be precipitated as solid compounds within the system.

Our method can be operated without introducing any significant quantity of soluble constituents into the treated water and consequently such water has higher value for re-use and less detrimental effect on the receiving water system.

In contrast, all of the methods in significant commercial usage at present employ metal oxides or metal salts and therefore add significant quantities of cations, or anions, or undissociated compounds, or combinations thereof, to the waste water, thereby reducing its suitability for subsequent re-use.

The invention need not necessarily be practiced within the context of a biological process. However, such practice can result in double benefits. The iron treatment can improve the operation of the biological process in various ways discussed in succeeding paragraphs, while the biological process provides a particularly convenient way of generating the desired aerobic and anaerobic conditions.

High density solids introduced into the system by our method can be of assistance in settling the sludge in a biological process so that it occupies less volume and reduces the problems attendant to the other methods, of disposal of voluminous excess sludge. This same characteristic can increase the settling rate of the sludge so that the liquid-clarification procedures typically practices in sewage treatment are more efficiently effected, or can be carried out in smaller, less costly equipment.

We have also found that the reaction of iron in our process can impart to the waste water solid particles that are susceptible to magnetic attraction. This characteristic can be effectively employed in the use of magnetic devices to produce a denser sludge at various stages of the treatment process. It can be utilized to reduce the volume of sludge to be disposed of, or to reduce the size of the aeration equipment by virtue of increased microorganism concentration obtainable or to assist in the liquid-clarification phase of the process.

We have also found that sludges which are less subject to denitrification can be produced by our process. Denitrification is a phenomenon which can occur in the solids separation phase in aerobic treatment systems. In oxygen depleted environments organisms can utilize such nitrates as are present and liberate nitrogen gas as a by-product. The liberated nitrogen can interfere with the sedimentation process that is typically employed for liquid clarification. In our process the presence of iron appears to retard the formation of nitrogen and thus provides a system less susceptible to the above undesired effects. This retardation of the denitrification reaction is associated with the solid constituents only; hence the clarified effluent from the process may be subjected to subsequent treatment processes wherein denitrification can be effectively accomplished, if desired.

Our method can be applied to existing or planned treatment facilities with very little additional equipment. In most cases, a contactor for water and iron is all that need be added. The aerobic and anaerobic phasing can be carried out by management of the existing or otherwise required equipment of the treatment facility.

Although contacting the waste water with the iron on a fixed bed can be made to produce some of the desirable results of our process, maintaining the iron in an agitated state has been shown to offer a number of advantages. Relative agitation of the iron in contact with waste water or aqueous medium makes it possible to regulate the rate at which iron is introduced to the system, such as by controlling the surface area of exposed iron in the reactor and/or the degree of energy applied in the reactor. The degree of agitation also controls the quantity of heavy solids produced, the beneficial effects of which have been previously referred to.

Furthermore, we have found that by contacting waste water containing active aerobic microorganisms with the agitated iron, we can increase the activity of the organism as measured by oxygen respiration rate with suitable correction for the additional oxygen utilized in converting the ferrous compounds present to the ferric form. This effect serves to reduce the size of the aerobic system which is required to provide an equivalent degree of removal of organic contaminants from the waste water.

Furthermore, if the contact of the iron with the waste water is conducted in a vessel wherein much of the iron is above the surface of the liquid a large wetted surface area is exposed to the atmosphere. Oxygen from the air is absorbed on the exposed surface and thereby is made available for metabolism of the organisms and reduces the quantity of oxygen required elsewhere in the process.

Interestingly, it has heretofore been generally accepted that vigorous mechanical treatment of aerobic sludges reduces the effective particle size, resulting in more stable dispersion, thus interfering with the following liquid solids separation phase. The teaching of U.S. Pat. No. 3,386,911 is consistent with this concept. We have found, on the contrary, that by milling aerobic sludges with iron in the reactor, we can obtain sludge which re-flocculates well, subsequent to treatment, and has more favorable settling characteristics than if not so treated.

In addition to all the other cited advantages, elemental iron in scrap form is quite economical in terms of theoretical removal capacity. As compared with treatment procedures using chemicals, the cost of today's prices of scrap iron used in the practice of this invention ranges from about 70% down to about 4% of the cost of chemicals used in previously known procedures. Although not previously suggested as a phosphorus removal agent, our invention makes the use of scrap iron practical for this purpose.

Various embodiments of the invention will now be disclosed by the accompanying drawings and the text which follows. In the drawings and text, like reference numerals denote like apparatus throughout. Only a few of the many possible embodiments of the invention can be discussed herein, but those skilled in the art will readily comprehend the many other possible embodiments falling within the scope of this invention, all of which are intended to be covered hereby.

BRIEF DESCRIPTION OF DRAWINGS

FIGS. 1–7 are diagrams of various waste water treatment methods and apparatus in accordance with the invention.

DESCRIPTION OF VARIOUS EMBODIMENTS

Figure 4:
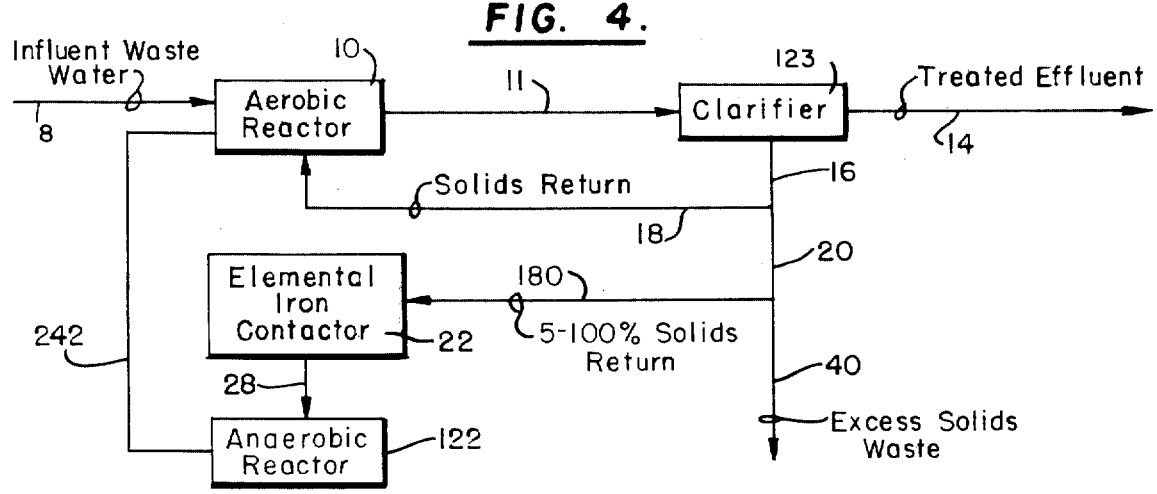

The contact of water with elemental iron is preferably conducted at an energy level and for sufficient time to consume about 1 to 16 atoms of iron per four atoms of phosphorus introduced to the system. The resulting mixture of iron compounds, phosphorous compounds and waste water or a portion of such mixture, may then be alternately subjected to aerobic and anaerobic conditions.

The criteria of aerobic and anaerobic conditions as expressed in this disclosure are believed to be generally consistent with those outlined by Jung, U.S. Pat. No. 3,135,686 and Levin, U.S. Pat. No. 3,236,766 and are familiar to those having ordinary skill in the art, but involve additional requirements with respect to the oxidation or reduction of iron. Whether the necessary conditions are present in a system for subjecting a major fraction of the suspended solids alternately to aerobic and anaerobic conditions can be indicated by measurements of the relative proportion of ferric to ferrous iron in the two stages of the process. The nature of the reaction with respect to either phase of the process in a continuous or batch system may be evaluated by determination of the change in ratio of ferrous to ferric materials present at spaced time intervals in a sample wherein the significant variables including dissolved oxygen, pH, and temperatures are maintained as constants subsequent to sampling. Observation of an increasing ratio of ferrous to ferric, for instance, indicates anaerobic conditions, a reduced ratio indicates aerobic conditions.

Determination of the oxidation reduction potential of the waste water under treatment is another means whereby the tendency to oxidize or reduce iron may be assayed provided other important and pertinent variables such as temperature, pH and constituency of the fluids are taken into account. The oxidation reduction potential is the electrical potential expressed in volts that would exist between an inert electrode and a normal hydrogen electrode immersed in the media. For the sake of simplicity, other reference electrodes such as saturated calomel are used with platinum serving as the inert electrode.

For the treatment process to function efficiently, the aerobic and anaerobic conditions should be maintained for a predetermined period of time. In each case the time period will generally be sufficient to convert an appreciable portion of the ferrous to ferric materials (in aerobic treatment) or vice versa (in anaerobic treatment). In a continuous process the average retention time may be approximated by dividing the volume of the reactor or zone by the total flow through it, in consistent units. Using this method, ten minutes or more retention time in each aerobic and anaerobic period is considered to be desirable.

The requisite conditions may be provided at different times in the same reaction zone or at the same time in different reaction zones; and the zone or zones may be located in one or more reactors or vessels. Batch or continuous operation is feasible. Therefore, it should be understood that aerobic reactor and anaerobic reactor may refer to the same or different reactor(s) or different parts of the same reactor.

The aerobic conditions may be established and maintained by the provision of air, oxygen, or other oxidizing agents to the aerobic reactor. The anaerobic conditions may be established and maintained by the provision of reducing agents to the anaerobic reactor or clarifier. Hydrogen sulfide or hydrazine are examples.

In a biological treatment process the anaerobic conditions may be established and maintained by excluding readily available forms of oxygen, including air, in which instance the microorganisms present establish and maintain the anaerobic conditions. The convenience of applying the invention in the context of a biological treatment process is partly attributable to this capability.

Through the above mentioned combination of steps, the phosphorus comes in contact with the iron or with products of reaction between the iron and water under conditions which foster efficient conversion of phosphorous to insoluble iron/phosphorus compounds and/or complexes and/or absorbates and/or adsorbates (all of which for convenience are hereinafter referred to as phosphorus compounds) which are readily concentratable and separable from the clarified water by sedimentation, filtration or other means. Upon separation of the relatively clear fraction from the other fraction which contains the majority of the suspended material, the phosphorus content of the clarified fraction has been reduced. At least a part of the fraction containing the majority of the suspended material, also referred to as solids or slurry, may be recycled back into the process. The iron need not be pure; that is, alloys (such as steel) may be used. The alloys are preferably those which are readily corrodable, as they most readily give up iron to the water. Alloys substantially free of elements considered poisonous to microorganisms are also preferred, otherwise it may be necessary to control or remove the content of such poisons in the water undergoing treatment.

It is preferred that the iron be employed as a particle form mass, a plurality, e.g., many discrete pieces of iron, said pieces of iron each having portions contiguous with other pieces to provide spaces for the passage of water through the mass. When these pieces are connected, they lend themselves to a type of operation in which the mass is tumbled in a rotating chamber through which the water flows, as shown in U.S. Pat. No. 513,686 to Scowden. As tumbling pieces of iron strike one another they abrade one another, assisting in the desired consumption of iron.

A number of variables affect the amount of energy required to consume a given amount of iron, including the average ratio of surface to weight of the iron, the shape of the iron, the weight of iron in the reactor, and the rate of application of energy per unit weight of iron in the reactor.

In general, other conditions being fixed, the energy required to consume a given quantity of iron, will be inversely related to the specific surface or the ratio of surface area to weight of iron. In addition, the quantity of iron required in the reactor to release a given amount of iron with a given amount of energy will generally be inversely related to the specific surface of the iron. In this type of process, one may employ, for example, a specific surface of approximately 2 sq. cm. per gram of iron.

Energy requirements are not critical, however, approximately 4 KWH per KG of influent phosphorus is considered practical and adequate for iron of the above specific surface. Those skilled in the art will readily adjust these parameters as required for various applications of the invention.

Contacting water with elemental iron in accordance with the invention forms reaction products which are of undetermined composition but are believed to include one or more of the following: (a) insoluble compounds including both phosphorus and iron or (b) iron oxide, hydroxide, or carbonate, which in turn appear to react with phosphorus to form phosphorus compounds or (c) iron in ionic form which reacts similarly or (d) a combination of the foregoing. It is of interest that the solid reaction products of phosphorus may be formed directly, as when incoming waste water is itself contacted with the particle-form mass of iron, and/or indirectly as when the incoming waste water is mixed with a quantity of other water which has been contacted with the particle-form mass of iron.

Although the invention need not necessarily be practiced within the context of a biological waste water treatment process, the desired aerobic and anaerobic conditions are readily produced by such processes and such processes are benefited in unexpected ways when the invention is applied thereto. The invention lends itself particularly well to a process in which waste water and activated sludge are subjected to aerobic conditions and anaerobic conditions in aerobic and anaerobic reactors and in which phosphorus impurities are circulated in a loop which traverses (passes through) at least one aerobic reactor and at least one anaerobic reactor, and in which water is contacted with a particle form mass of elemental iron under relative agitation and subsequently circulated in said loop under said aerobic and anaerobic conditions in contact with said sludge.

In practicing the invention, the embodiments of FIGS. 1, 2 and 3 are preferred, and that shown in FIG. 2 is considered best.

In the diagram of FIG. 1, the waste water enters through a line 8 directly into an aerobic reactor 10 which may be of the type commonly employed in activated sludge plants. Herein, the pH is typically maintained in the range of about 5 to about 9. After the desired residence time, the waste water passes via line 11 to an anaerobic clarifier 12, a conventional clarifier operated under anaerobic conditons. From it the clear liquid effluent is discharged through line 14. Separation of clear liquid from aqueous solids or sludge in clarifier 12 takes place by gravity. Aqueous solids or sludge is drawn off through line 16. It has a branch 18 for returning a part of the sludge to the aerobic reactor and branches 20 and 180 for delivering anywhere from 5 to 100 percent of the solids to the contactor 22. The latter contains the elemental iron which is preferably subject to agitation. After exposure of the iron to the component of the waste water which contains sludge in contactor 22, the mixture passes through line 24 back to the aerobic reactor where the reaction product of the iron is mixed with the waste water incoming through line 8. Excess solids, which contain the phosphorus and other impurities removed by the process, are discharged through line 40 to further treatment or disposal. Although shown as an extension of line 20, discharge line 40 could also discharge from any desired location such as lines 11, 16, or 18; reactor 10; clarifier 12; or any combination thereof.

In FIG. 2 as in FIG. 1, waste water containing for example 4 ppm or more of phosphorus is admitted through line 8 and passes directly into the aerobic reactor 10 where aerobic and possibly also faculative organisms may be functioning. Waste water from this reactor passes through line 26 directly to the elemental iron contactor 22. The resulting reaction products return as above described through line 24 to aerobic reactor 10. Waste water from reactor 10 also passes via line 11 to anaerobic clarifier 12 where anerobic and possibly also faculative organisms may be functioning. A part of the sludge separated in the clarifier 12 returns through pipes 16 and 18 to the aerobic reactor 10 as in FIG. 1. Therein, they are commingled with the waste water entering the system through line 8 and the waste water containing aqueous reaction products of iron from the iron contactor introduced through line 24. The remainder of the solids from clarifier 12 are conducted from the process through line 40 for further treatment or disposal. Treated effluent is discharged through line 14.

FIG. 3 shows a system identical to FIG. 2 excepting that the clarifier 121 is aerobic (thus functioning in part as an aerobic reactor) and the return sludge therefrom is passed to anaerobic reactor 122 through lines 18 and 16 and thence via line 242 to aerobic reactor 10.

In the embodiment of FIG. 4, the waste water arriving through line 8 into the aerobic reactor 10 is delivered via line 11 to the chamber 123. This chamber is a clarfier only. The clear liquid is discharged as before through the line 14. The solids return with a part of the liquid through the lines 16 and 18 to the aerobic reactor 10. Another component is passed through the lines 20 and 180 to the elemental iron contactor 22. Part of the solids are discharged through line 40 to disposal or further treatment as in the other embodiments. The component reaching the elemental iron contactor may contain anywhere from 5 to 100 percent of the solids from the clarifier 123. The discharge from chamber 22 is through the line 28 to anaerobic reaction chamber 122 from which the return occurs by line 242 to the aerobic reactor chamber 10.

Figure 5:
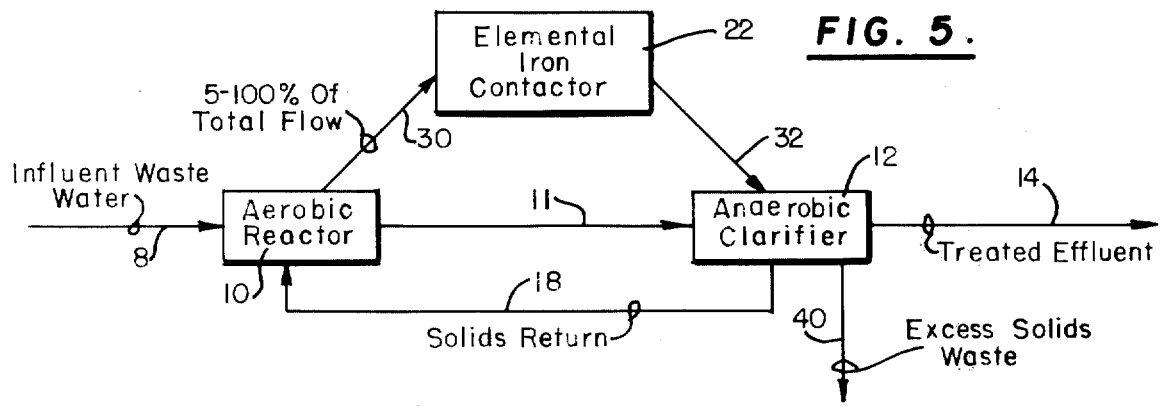

In the FIG. 5 embodiment, the incoming waste water entering the aerobic reactor 10 through line 8 passes in part to the anaerobic clarifier 12 through duct 11 and in part to the elemental iron contactor 22, the latter being in a bypass which comprises ducts 30 and 32. From the anaerobic clarifier the clear liquid is discharged as before through the line 14 while the solids return through line 18 to the aerobic reactor. Excess solids are conducted from the system through line 40.

Figure 6:
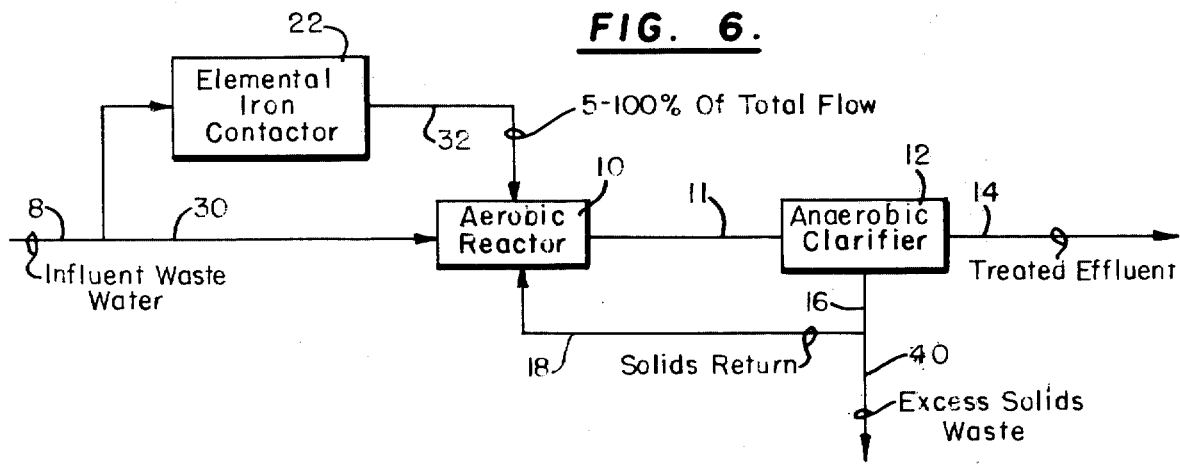

In the embodiment of FIG. 6, the flow of waste water entering via line 8 is divided between the elemental iron contacting chamber 22 and bypass line 30 so as to deliver anywhere from 5 to 100 percent of the total flow from the inlet line 8 via from contactor 22 and line 32 to the aerobic reactor chamber 10. From the latter waste water passes via duct 11 into the anaerobic clarifier 12 whence the clear liquid is drawn off through pipe 14. Solids are returned through pipe 16 and 18 to the aerobic reactor and also discharged from the system through line 40.

Figure 7:
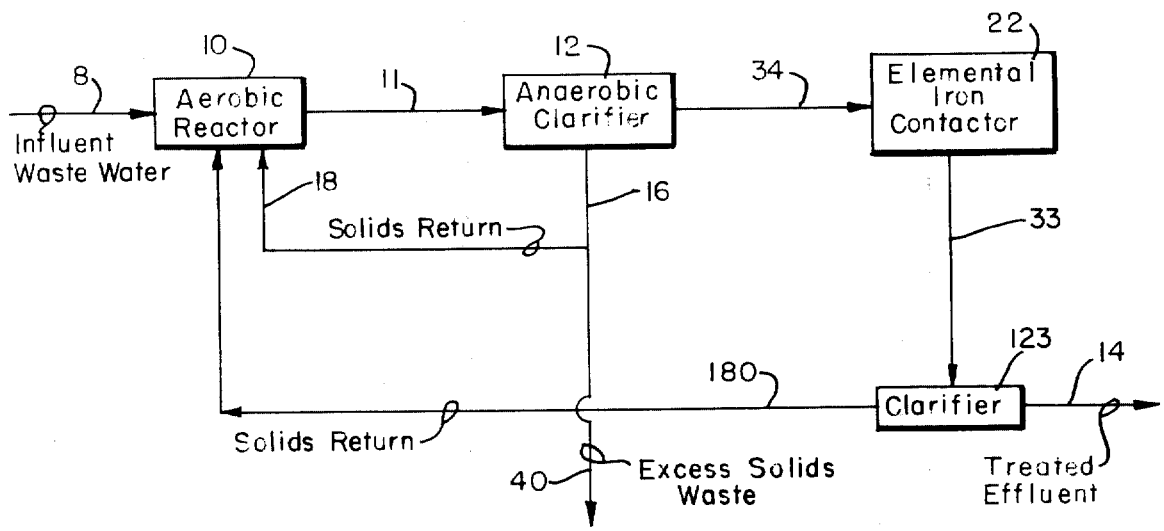

In FIG. 7 waste water is conducted through the inlet pipe 8 into the aerobic reactor 10. Thence the water passes through pipe 11 to the anaerobic clarifier 12. From it a major part of the solids are returned to the aerobic reactor through pipe 16 and 18. Excess solids are discharged through line 40. The waste water and at least part of the remaining separated solids pass through pipe 34 to the elemental iron contacting chamber 22. After leaving this chamber, the waste water and solids pass to a clarifier 123 via pipe 33. From here the clear liquid effluent is drawn off through pipe 14 and the solids are returned through pipe 180 to the aerobic reactor 10.

No specific showing of the clarifier is made, since gravity and other techniques of separating a clear fluid from solids or sludge are well-known and any device employing one or more known clarifying techniques qualify as a clarifier herein. It will also be understood that pumps will be used wherever necessary to achieve movement of the liquid in the directions indicated by the arrows in the diagrams.

Figure 8:
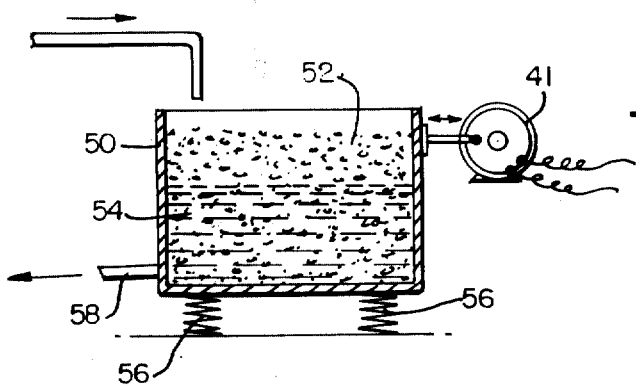
FIG. 8 is a diagrammatic view of a chamber in which waste and iron materials may be subjected to agitation and oxidation.

FIG. 8 shows diagrammatically a chamber 50 open to the atmosphere and containing elemental scrap iron 52 in small particles. Chamber or vessel 50 is mounted on resilient support means (springs) 56 and has means for subjecting the scrap iron and the waste water 54 in which it is partially immersed to agitation. For the purposes of illustration a vibratory electrically agitator 41 is shown connected with chamber 50. But any other sonic, electrical, mechanical or other vibrating means may be employed. The rate of vibration is not specifically important but should be such as to slosh the liquid over the surface of the iron in the presence of the air to which such surfaces are otherwise exposed. This is intended to promote absorption of the oxygen of the air into the waste water, so as to promote oxidation of the iron. Treated water may be withdrawn through line 58.

The iron contactor may be one of several other types of process equipment designed to maintain solids in agitation and in contact with liquids. One type particularly well-suited to the requirements of this process is the rotary mill. A hollow cylinder, with substantially horizontal axis, is rotated on a central shaft or on trunnions. It may be fitted at both ends with bulkheads which have a small central opening through which the waste water may enter and exit, but which will retain the elemental iron charge which has an apparent volume of up to 50 percent of the volume of the cylinder. The iron is the reactor may be of varied shapes and sizes and may be used alone or in combination with other abrasive materials such as sand or gravel which are not directly involved in the chemical reactions.

The invention is illustrated by the following non-limiting example:

EXAMPLE

This example is conducted in accordance with the embodiment of FIG. 2, based on 400,000 liters per day average flow of influent through line 8, predominantly domestic waste, that has a 5 ay biological oxygen demand of approximately 200 mg/l, a suspended solis concentration of 200 mg/l, a total phosphorus concentration of 15 mg/l as P, and a nitrogen concentration of 40 mg/l as N. The aerobic reactor is a tank approximately 3.6 meters deep, having a volume of approximately 170 cu. meters. Air is introduced into the bottom of the tank in sufficient quantity to maintain the dissolved oxygen concentration at about 2 mg/l., and in such a way as to keep the contents of the reactor well mixed and the solids in suspension. Four cu. meters/min. of air, more or less are employed. Liquids from the aerobic reactor passes through line 11 to the anaerobic clarifier, which is a circular tank approximately 6 meters in diameter and 3.6 meters deep. Influent is admitted through a central tube approximately 1.5 meters in diameter with its axis vertical, and extending from the surface to a depth of approximately 1.6 meters below the surface. The outer periphery of the clarifier is fitted with a circular launder and leveled weir plates so as to distribute the flow uniformly around the circumference of the outer side wall. Treated effluent collected in this launder is conducted through line 14 to the point of disposal.

The quiescent conditions prevailing in the clarifier permit the suspended material to settle to the bottom. The overflow liquid may for example have the following characteristics:

5 day biological oxygen demand — 15 mg/l.,
Suspended solids concentration — 15 mg/l.,
Total phosphorus concentrations — 2 mg/l, as P;
Nitrogen concentration — 30 mg/l, as N.

The bottom of the clarifier is fitted with a suitable collector device, having rakes mounted on arms which are attached to a central vertical shaft, so that as the shaft rotates, the suspended material that settles to the bottom is conveyed to a central hopper from which it is pumped into line 16. This pumping rate may be controlled so that the slurry that flows out of the bottom of the clarifier has a residence time therein of approximately 8 hours, which in this instance corresponds to a rate of approximately 180,000 liters/day. Since the slurry in the bottom of the clarifier is deprived of contact with air, anaerobic conditions are established and maintained for much of this residence time.

A portion of this flow is wasted from the system through line 40. Under stable operating conditions this quantity may be approximately 9,000 liters/day, at a suspended solids concentration of approximately 10,000 mg/l. Approximately 5 Kg of phosphorus and 10 Kg of iron can typically be contained in the 9,000 liters.

The remainder, approximately 170,000 liters per day, is returned through line 18 to the aerobic reactor, where it is mixed with the incoming waste water, forming a mixture, called mixed liquor, having a suspended solids concentration of approximately 3300 mg/l.

This mixed liquor is pumped from the aerobic reactor through line 26 at a rate of approximately 120,000 liters/day to elemental iron contactor 22 and thence returns by gravity at the same rate to the aerobic reactor.

The elemental iron contactor is a steel cylinder, 1.2 meters diameter by 1.8 meters long, mounted on trunions and fitted with a 2 H.P. variable speed drive capable of rotating it from 0 to 6 R.P.M., and can be charged with up to 1200 Kg of scrap iron or steel having a specific surface of approximately 2 $cm^2/gm$. such as may be obtained from operations which reclaim scrap steel from automobiles by shearing and hammer milling, or scrap from stamping operations. The charge is retained in the drum by two end plates which have central openings approximately 18 inches in diameter. The drum may be fitted with corrosion abrasion resistant alloy steel lifting flights that serve to agitate the charge and to protect the drum from internal wear and corrosion. Speed of the drum and size of the charge are regulated to provide sufficient iron reaction products to the system to control the effluent phosphorous concentration to the desired value. The amount of iron required to obtain the effluent quality of this example can be for example 10 Kg per day.

What is claimed is

1. A process for the treatment of waste water comprising dissolved phosphorous compounds, including mixing the aqueous reaction products of elemental iron with waste water, exposing the resulting mixture alternately to aerobic and anaerobic conditions in either sequence, and clarifying the resulting liquid-solid suspension to produce a fraction from which has been removed suspended solids, including insolublized phosphorous compounds.

2. A process in accordance with claim 1 wherein the ratio of iron addition is within the range of about 1–16 mols of iron per 4 mols phosphorous in the waste water.

3. A process for the treatment of waste water comprising dissolved phosphorus compounds, including contacting the waste water with the elemental iron, subjecting the waste water alternately to anaerobic and aerobic conditions in either sequence and clarifying the waste water to produce a fraction from which has been removed suspended solids, including insolubilized phosphorus compounds.

4. A process according to claim 3 in which the contacting of waste water with iron is conducted in the presence of oxygen.

5. A process for the treatment of waste water to reduce the phosphorus content thereof comprising incorporating aqueous reaction products of elemental iron in a biological treatment process in a ratio of about 1 to 16 atoms of iron to four atoms of phosphorus, subjecting the mixture to alternate aerobic and anaerobic conditions for a period of at least 10 minutes each and clarifying the mixture to produce a fraction in which the suspended solids have been substantially reduced in concentration.

6. A process for the treatment of waste water to reduce the phosphorus content thereof comprising contacting waste water with agitated elemental iron, introducing the resultant products to a biological treatment system to provide a ratio of added iron to total phosphorus in the range of about 1 to 16 atoms of iron per four atoms of phosphorus in the waste water subjecting the resulting mixture to alternate aerobic and anaerobic conditions for a period of at least ten minutes each, and clarifying the mixture to produce a liquid component in which the suspended solids have been substantially reduced in concentration.

7. In a biological process for the treatment of waste water containing suspended material, the steps of milling a biologically active sludge by agitation with particulate iron thereby reducing the particle size of the suspended materials, and substantially separating said sludge into fractions of varying solids content.

8. A process in accordance with claim 7 wherein the milling operation is conducted in the presence of oxygen.

9. In a process wherein waste water and activated sludge are alternately subjected to aerobic and anaerobic conditions in suitable vessels and in which phosphorus compounds are circulated in a loop which traverses said vessels, the improvement which comprises contacting waste water with a particle form mass of elemental iron under relative agitation and thereafter circulating said water in said loop in contact with said sludge under said aerobic and anaerobic conditions.

10. An apparatus for the treatment of waste water comprising a mass of particulate elemental iron, a first receptacle for holding and agitating said iron and water, an aerobic reactor comprising a second receptacle, an anaerobic reactor comprising a third receptacle, and means for conducting said waste water through the first receptacle and then, in either sequence, through the second and third receptacles.

11. Apparatus in accordance with claim 10 in which the first receptacle is in communication with a source of gaseous oxygen.

12. Apparatus for the treatment of waste water comprising a mass of particulate elemental iron, a first receptacle for holding and agitating said iron and an aqueous component, an aerobic reactor comprising a second receptacle, an anaerobic clarifier comprising a third receptacle with means for separating a clarified fraction from a more concentrated fraction, and means for conducting said aqueous component through said first-mentioned receptacle and then, it either order, through said second and third receptacles.

13. Apparatus in accordance with claim 12 in which the first receptacle is in communication with a source of gaseous oxygen.

14. Apparatus in accordance with claim 12 in which is conducting means is provided for conducting said concentrated fraction from the clarifier to the first receptacle.

15. Apparatus in accordance with claim 12 in which a conducting means is provided for connecting the aerobic reactor to the first receptacle.

16. A biological process for the treatment of waste water including milling a biologically active sludge by agitation with particulate iron, exposing the resultant mixture alternately to aerobic and anaerobic conditions in either sequence and clarifying the resulting liquid-solid suspension to produce a fraction from which the suspended solids have been substantially removed.

* * * * *